A. BUTTON.
Scoop.

No. 203,885. Patented May 21, 1878.

Witnesses.
Charles A. Begley
Mark J. Leddell

Inventor.
Alphonzo Button

UNITED STATES PATENT OFFICE.

ALPHONZO BUTTON, OF EAST SAGINAW, MICHIGAN, ASSIGNOR OF TWO-THIRDS HIS RIGHT TO JOSIAH AMES AND MARK J. LIDDELL, OF SAME PLACE.

IMPROVEMENT IN SCOOPS.

Specification forming part of Letters Patent No. 203,885, dated May 21, 1878; application filed April 11, 1878.

*To all whom it may concern:*

Be it known that I, ALPHONZO BUTTON, of the city of East Saginaw, county of Saginaw, and State of Michigan, have invented certain new and useful Improvements in the Construction of Grocers' Scoops; and I do hereby declare that the following is a full, clear, and exact description thereof, reference being had to the accompanying drawings, making a part of this specification, in which—

Figure 1:
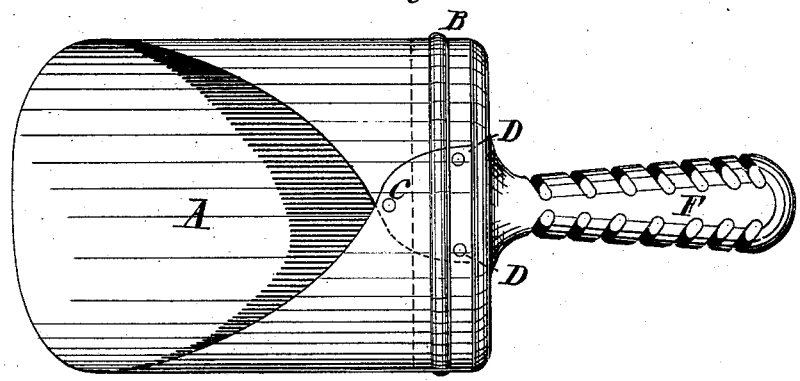
Figure 2:
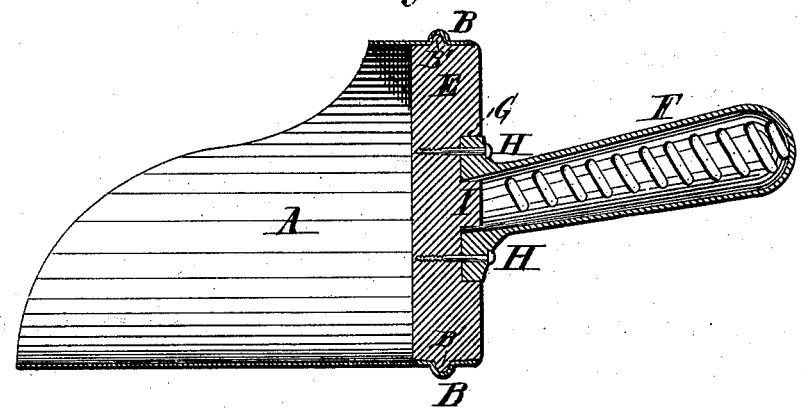

Figure 1 is a longitudinal elevation of the invention, and Fig. 2 is a longitudinal section of the same.

The invention relates to the mode of attaching the metallic cup to a wooden head or hub in the construction of grocers' scoops of this class, and in the attachment of an adjustable skeleton metallic handle thereto.

Hitherto in the construction of grocers' scoops of this class the cup or metallic band has either been attached to the wooden head by inserting the edge of the cup into a narrow channel formed at the end on the lower side of the head by a band-saw, and secured to said head by means of rivets, or by upsetting the edge of the cup or metallic band, forming a narrow inverted flange, which, in attaching said cup to the head, is inserted and forced into a narrow channel turned in the head around its circumference on the outer surface, and otherwise secured thereto about as shown in present device, the head and handle being turned out of one solid block of wood, the handle being straight and formed on the center of said head. Both of said methods are objectionable, because of the great waste of lumber, the lack of sufficient strength and durability on account of the head being turned across the grain of the wood, the difficulty of procuring suitable material of the proper dimensions, and of properly seasoning the same to prevent shrinkage away from the metal; also, in the latter case, the difficulty incurred in forming this inverted flange on the edge of the metallic cup, so as to insert in the narrow channel; and in case where it is desired to enamel-finish the wooden head, this channel or groove will become filled up and obliterated; and also, in consequence of this channel turned so near the edge of the wooden head, in attaching the cup thereto small pieces will chip off around the entire circumference of the head; also, the handle, being straight, will in its use tire and lame the wrist of the operator in poising the scoop to retain its contents.

The object of my invention is to provide a cheap and more substantial scoop, in the use of such lumber in the construction of the wooden head which is more readily procured, and, being turned parallel with the grain of the wood, is thereby less liable to check or split, having a narrow head turned thereon for attaching the cup by means of a corresponding groove formed in the latter, and in the adoption of an adjustable skeleton metallic handle, so attached to the head as to give the desired pitch thereto in the more natural poise of the scoop, and also in the great saving of lumber and of labor in properly seasoning the same so as to prevent shrinkage, and also in turning.

I form the cup A of tin or other suitable sheet metal, as shown. I preferably form a narrow groove at B, upper side, Fig. 2. The portion of the cup on the cut-away side or top, which is made the meeting side of the folded cylinder or cup A, is formed with extended wings overlapping each other, as shown at curved and dotted lines terminating at D D.

The head or hub E is turned of wood, having a narrow head, B', turned around the entire circumference in the center of a beaded shoulder formed on said head E, to which the corresponding groove B, formed in the folded cylinder or cup A, as shown at Fig. 2, is fitted, and held in position by rivet C and nails D D, Fig. 1.

The head or hub E is also provided with a circular mortise or channel, G, turned in the center of the outside, leaving a center or standard, I, around which the handle F is fitted, to add strength in its attachment to the head.

The metallic handle F is made of thin hollow iron, with spiral openings to lighten the same, which spirals are disconnected by a narrow rib on the upper and lower sides, the said handle being provided with a broad circular disk or shoulder at its base, having a hole in the center fitted and made to correspond with the circular mortise or channel G and standard I in the wooden head E, and secured thereto by means of screws H, Fig. 2.

Should it be deemed advisable, the handle may be made partly of wood and partly of iron, and in this case a socket or thimble of a suitable length from the base or disk may be left, having a screw-thread formed on the inner surface; and the balance of the handle may be turned of wood, leaving a shoulder at the end and a screw-thread formed thereon, corresponding with the thread in said thimble, and screwed firmly into position, otherwise secured to the head of the scoop, as in case of present handle. By this substitution the scoop may be lightened: or, instead of the thimble, a thin plate may be formed of suitable length, and the wood handle turned to correspond, and a channel sawed in the end thereof, and the plate inserted therein and secured by rivets or screws, as the handles of case-knives are sometimes constructed.

Having thus described my invention, what I claim as new, and desire to secure by Letters Patent, is—

1. The combination of the wooden scoop head or hub E, having a bead, B', circular mortise or channel G, and center standard I with the metallic cup A, having a groove, B, corresponding with and formed to receive the bead B' in the attachment of the cup A to the head E.

2. An adjustable skeleton metallic handle, F, provided with a circular disk or shoulder at its base, having a hole in the center, and secured to a wooden head of scoops or other articles by means of screws H H, substantially as and for the purposes set forth.

ALPHONZO BUTTON.

Witnesses:
MARK J. LIDDELL,
CHARLES A. BEGLE.